Patented Nov. 19, 1940

2,222,560

UNITED STATES PATENT OFFICE 2,222,560

CHEESE FLAVORED POPPED POPCORN

Forest H. Clickner, Chicago, Ill., assignor to Kraft Cheese Company, a corporation of Delaware No Drawing. Application February 13, 1935, Serial No. 6,387

6 Claims. (Cl. 99—134)

So far as I am aware, no one before me has produced a popped popcorn or similar farinaceous product coated with sufficient cheese to flavor the same in such a way as to make it commercially feasible. The production of such a product presents various technical difficulties. Thus, to make a cheese-coated popcorn that can be sold commercially, it becomes apparent that an amount of cheese must be added sufficient to give the desired flavor, the cheese must be added so as to make the product economically sound, the cheese must in itself have no property which will affect the crispness of the popcorn so as to detract from its edibility, and the cheese must have keeping qualities against rancidity, so that the cheese-flavored popcorn can be kept for extended periods of time at ordinary temperatures such as prevail in stores, etc.

While I have found I could obtain certain types of cheese on the market that could be melted and applied to popped popcorn, I found that such melted cheese had a high viscosity and coated the popcorn excessively, making the taste undesirable. If less cheese were used, the popcorn could not be coated uniformly. Aside from this, I found that since these available types of cheese contain around 40 per cent moisture, the crisp popcorn soon absorbed much of the moisture and became soggy and inedible. Another reason why I found this type of cheese impracticable is that it would go rancid at ordinary temperatures in a short time. I also found that such a type of cheese, because of its high viscosity and its tendency to string and oil, made it impossible to coat the popcorn in an economical way to produce cheese-coated popcorn on a commercial basis.

An object of my invention, therefore, is to combine cheese with popped popcorn in such a manner that a relatively small quantity of cheese is sufficient to produce a desired cheese flavor in the popcorn, without changing the essentially farinaceous character of the popcorn and without raising the price substantially above that of ordinary buttered popcorn.

A further object is to apply the coating to the popcorn in such a manner that it will adhere tenaciously and penetrate the starchy substance, so as to form a permanent combination therewith.

Still another object is to provide a cheese-coated popcorn food which will be dry and crisp and will remain so, and which will also be stable against rancidification and other spoilage for long periods of time, and which will avoid the other difficulties outlined above.

I have found that these and other objects, which will become apparent as the description proceeds, may be achieved by combining cheese with an edible fat and applying this mixture to the popcorn, preferably by spraying the same while in a thinly fluid condition.

In accordance with a preferred embodiment of my invention, I use as the cheese ingredient a special anhydrous cheese powder, although other types of dry cheese may be used. The dry cheese may be made in various ways, as, for example, by dividing the cheese into small pieces and placing it in a drying oven or tunnel at a moderate temperature. It may also be produced according to the method described in my copending application Serial No. 725,346, filed May 12, 1934. This method is substantially as follows:

Make up a blend of good aged American cheese, preferably low in moisture. Comminute the mix and heat to a temperature of about 165° F., preferably with direct saturated steam. Sufficient water should be added to bring the moisture content up to about 70 per cent, preferably together with sufficient citric or other acid so that the end product has a pH value of about 5.0.

Instead of using water and citric acid or other acid, as described, there is a material advantage in employing an acid whey solution, or an acid milk (whole or skim) may be employed. Also, in place of using citric acid, other acids such as malic acid may be used. However, I prefer to use as the acid source, whey which has been permitted to develop its acid naturally.

During and subsequent to the heating, and after the addition of the acid solution, the mixture is vigorously agitated so as to obtain as uniform a mixture as possible. It is then preferably homogenized and, before cooling, conducted by some suitable form of forced feed apparatus directly to the spray heads of a spray drying equipment such as is used for the desiccation of milk. The end product will be a powder containing about 0.8 per cent of moisture and the acidity should be about pH 5.0, sufficient acid or acid whey having been added, if necessary, to produce this acidity in the end product.

The cheese powder produced as described above is admixed with a fatty material in a manner which will now be described:

The fats which I have found especially suitable in connection with my invention are anhydrous ones, such as refined cocoanut oil and hydrogenated cocoanut, cottonseed, sesame or corn oil. Numerous other edible fats which are solid at room temperature will suggest themselves, although, of course, market conditions will be an important factor in determining the choice of fats. The fat used for my purpose should have, in addition to the factors mentioned above, high stability against rancidification. For the cheese ingredient I prefer to use a dried, snappy, aged American cheese of good quality, preferably prepared in dry, powdered form, as described above.

As to proportions, in a preferred embodiment I may use 35 per cent of cheese and about 65 per cent of fat. However, these proportions may vary within wide limits and I may use as low as 15 per cent of cheese or as much as 50 per cent.

My preferred method of combining the cheese and fat is as follows:

The fatty ingredient is heated, as in a steam jacketed or hot water jacketed kettle, to about 150° F. The cheese ingredient is then introduced gradually with stirring, care being taken that all lumps are thoroughly broken up. The cheese goes into suspension freely and the agitation is continued until a uniform suspension is obtained. The temperature may then be reduced to about 140° F.

The material is then drawn off and is preferably strained to remove any large particles of cheese, the agitation being continued. The material is preferably run into a device where it can be whipped while being quickly cooled to a congealing temperature, such as an ice cream freezer. While, of course, it may be whipped without refrigeration, until it has congealed by giving off its heat to the atmosphere, it is found that the most practical and expedient procedure is the ice cream freezer technique, referred to above. It will be understood, of course, that there may be some tendency for the cheese and fat ingredients to separate during the cooling stage if the whipping is not continued. After congealing, the product may be placed in cans or other suitable containers and disposed in a cooler over night to complete the setting of the material.

It is highly desirable that contact of the ingredients with moisture be avoided throughout the entire process, and care should be taken that all containers, utensils and apparatus be entirely dry.

The composition prepared as described above consists of cheese in a finely divided form, substantially each particle of cheese being thoroughly coated with a film of fat. The cheese ingredient preferably contains not more than about 3 per cent of moisture, although this quantity may be less than one per cent if the cheese is prepared by the method described above. It should be understood, however, that a product may be made which is satisfactory under some conditions wherein the cheese constituent may contain somewhat more than 3 per cent of moisture, although, to obtain the highest quality, the moisture content should be as low as possible.

The material thus prepared, which is substantially solid at room temperature, preferably of a consistency similar to butter, may be readily applied to popcorn or the like, after melting, by pouring, spraying or in any other obvious or suitable manner.

In this way there may be applied to popcorn or similar farinaceous material a thin coating of cheese in a fat carrier as described above, whereby the popcorn or the like will have imparted thereto a pleasing cheese flavor at a minimum cost without appreciably modifying the well known and characteristic farinaceous qualities of the popcorn, such as its crispness, etc.

Such a material closely adheres to the surface of the cereal and to a certain extent penetrates into the starchy material so as to form a permanent combination therewith. My improved product has exceptionally high keeping qualities for goods of this character and said qualities are considerably enhanced when substantially anhydrous cheese and fat are used.

Various modifications coming within the spirit of my invention will readily suggest themselves to those skilled in the art, and, hence, I do not wish to be restricted to the specific embodiments or details set forth herein, but intend that the scope of my invention shall be limited only by the appended claims, which should be interpreted as broadly as the state of the art will permit.

While I have specifically mentioned popcorn above, it will be obvious that various similar farinaceous materials may be used in lieu thereof, such as the so-called "puffed cereals," as made, for example, by the well-known Anderson processes.

I claim as my invention:

1. A combination of the class described, comprising a popped popcorn having a relatively thin and closely adherent coating of cheese in a carrier of fat, said cheese and fat being substantially anhydrous.

2. A composition of the class described, comprising a popped popcorn having a relatively thin and closely adherent coating of finely divided cheese having a moisture content of not more than about 3 per cent in a carrier of a dry, edible fat.

3. The improvement in the art of imparting a cheese flavor to popped popcorn which comprises incorporating comminuted cheese of a low moisture content in a body of substantially dry edible fat, liquefying the mixture by the application of heat, whereby the cheese is uniformly distributed in said fat, and then spraying portions of the surface of the popcorn with the heated fluid material.

4. The improvement in the art of imparting a cheese flavor to popped popcorn, which comprises incorporating comminuted cheese in a body of edible fat, said cheese and fat being substantially dry, liquefying the mixture by the application of heat, whereby the cheese is uniformly distributed in said fat, and then coating portions of the surface of the popcorn with the heated fluid material.

5. A cheese-flavored food comprising popped popcorn provided with a relatively thin and closely adherent coating comprising dried comminuted cheese of a low moisture content in a carrier of edible oil, said oil being substantially free from moisture.

6. The method of coating popped corn with a cheese mixture which includes the steps of spraying a liquid cheese mixture containing dehydrated cheese and a dehydrated edible oil onto grains of freshly popped corn while agitating and shifting the positions of such grains to bring the surfaces of substantially all the grains into contact with the spray of the cheese mixture.

FOREST H. CLICKNER.